(12) United States Patent
Tamoto et al.

(10) Patent No.: US 11,504,883 B2
(45) Date of Patent: Nov. 22, 2022

(54) RESIN PARTICLE PRODUCING METHOD

(71) Applicant: RICOH COMPANY, LTD., Tokyo (JP)

(72) Inventors: Nozomu Tamoto, Shizuoka (JP); Hitoshi Iwatsuki, Kanagawa (JP); Yasuo Suzuki, Shizuoka (JP); Yasuyuki Yamashita, Kanagawa (JP); Sohichiroh Iida, Kanagawa (JP); Shinzo Higuchi, Tokyo (JP); Akira Saito, Kanagawa (JP); Kiichi Kamoda, Kanagawa (JP); Yoshihiko Furugohri, Shizuoka (JP); Shinsuke Nagai, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 417 days.

(21) Appl. No.: 16/763,126

(22) PCT Filed: Nov. 9, 2018

(86) PCT No.: PCT/JP2018/041691
§ 371 (c)(1),
(2) Date: May 11, 2020

(87) PCT Pub. No.: WO2019/093490
PCT Pub. Date: May 16, 2019

(65) Prior Publication Data
US 2020/0398458 A1 Dec. 24, 2020

(30) Foreign Application Priority Data

Nov. 13, 2017 (JP) .............. JP2017-218418
Aug. 29, 2018 (JP) .............. JP2018-160148
Nov. 5, 2018 (JP) .............. JP2018-208203

(51) Int. Cl.
| B29B 9/06 | (2006.01) |
| B29B 9/14 | (2006.01) |
| C08J 3/12 | (2006.01) |
| B33Y 70/00 | (2020.01) |
| B29B 9/12 | (2006.01) |

(52) U.S. Cl.
CPC .......... B29B 9/06 (2013.01); B29B 9/14 (2013.01); C08J 3/12 (2013.01); B29B 2009/125 (2013.01); B33Y 70/00 (2014.12); C08J 2323/08 (2013.01); C08J 2323/12 (2013.01); C08J 2367/02 (2013.01)

(58) Field of Classification Search
CPC ....... B29B 9/06; B29B 2009/125; B29B 9/14; C08J 3/12
USPC ....................................... 264/140
See application file for complete search history.

(56) References Cited

U.S. PATENT DOCUMENTS

| 2006/0225252 A1 | 10/2006 | Shindo et al. |
| 2008/0286677 A1 | 11/2008 | Yabe et al. |
| 2015/0336292 A1 * | 11/2015 | Mikulak ............ D01F 8/12 428/402 |
| 2016/0160021 A1 | 6/2016 | Kojima et al. |
| 2016/0177122 A1 | 6/2016 | Naruse et al. |
| 2016/0236412 A1 | 8/2016 | Kusahara et al. |
| 2016/0271877 A1 | 9/2016 | Suzuki et al. |
| 2016/0271879 A1 | 9/2016 | Yamashita et al. |
| 2017/0209927 A1 | 7/2017 | Yamashita et al. |
| 2017/0217087 A1 | 8/2017 | Tamoto et al. |
| 2017/0225404 A1 | 8/2017 | Naruse et al. |
| 2017/0305036 A1 | 10/2017 | Mikulak et al. |
| 2018/0001520 A1 | 1/2018 | Saito et al. |
| 2018/0022024 A1 | 1/2018 | Saito et al. |
| 2018/0023219 A1 | 1/2018 | Saito et al. |
| 2018/0147780 A1 | 5/2018 | Kamoda et al. |
| 2018/0186034 A1 | 7/2018 | Mikulak et al. |
| 2018/0264720 A1 | 9/2018 | Tamoto et al. |
| 2018/0264721 A1 | 9/2018 | Iida et al. |
| 2018/0273756 A1 | 9/2018 | Saito et al. |
| 2018/0281232 A1 * | 10/2018 | Devaraj ............ B29B 9/06 |
| 2018/0355144 A1 | 12/2018 | Saito et al. |
| 2019/0240869 A1 | 8/2019 | Devaraj et al. |
| 2019/0275702 A1 | 9/2019 | Mikulak et al. |

FOREIGN PATENT DOCUMENTS

| JP | 5-177587 A | 7/1993 |
| JP | 2004-231700 | 8/2004 |
| JP | 2006-106236 | 4/2006 |
| JP | 2006106236 A * | 4/2006 |
| JP | 2006-291373 A | 10/2006 |
| JP | 2008-096949 | 4/2008 |
| JP | 4354869 | 8/2009 |
| JP | 2009-235601 | 10/2009 |
| JP | 4435738 | 1/2010 |
| JP | 4567509 | 8/2010 |
| JP | 5300231 | 6/2013 |
| JP | 2014-234427 | 12/2014 |
| JP | 2016-049662 | 4/2016 |

(Continued)

OTHER PUBLICATIONS

Translation of JP 2006-106236 (application 2004-290954), Apr. 20, 2006. (Year: 2006).*
International Search Report dated Jan. 29, 2019 for counterpart International Patent Application No. PCT/JP2018/041691 filed Nov. 9, 2018.

(Continued)

*Primary Examiner* — Hui H Chin

(74) *Attorney, Agent, or Firm* — Grüneberg and Myers, PLLC

(57) ABSTRACT

Provided is a resin particle producing method including: a fiber aggregate producing step of directly joining fibers containing a thermoplastic resin with each other to obtain a fiber aggregate; and a particle forming step of forming the fiber aggregate into particles to obtain resin particles.

19 Claims, 5 Drawing Sheets

(56) References Cited

FOREIGN PATENT DOCUMENTS

JP      2018-196984      12/2018
WO   WO 2017/112723 A1   6/2017

OTHER PUBLICATIONS

Written Opinion dated Jan. 29, 2019 for counterpart International Patent Application No. PCT/JP2018/041691 filed Nov. 9, 2018.
Extended European Search Report dated Nov. 16, 2020 in European Patent Application No. 18876445.0, 8 pages.

* cited by examiner

[Fig. 1]
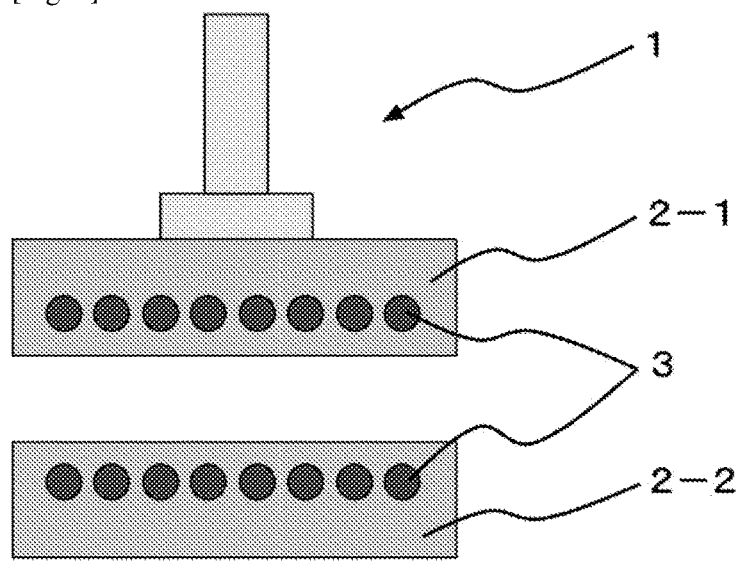
[Fig. 2A]
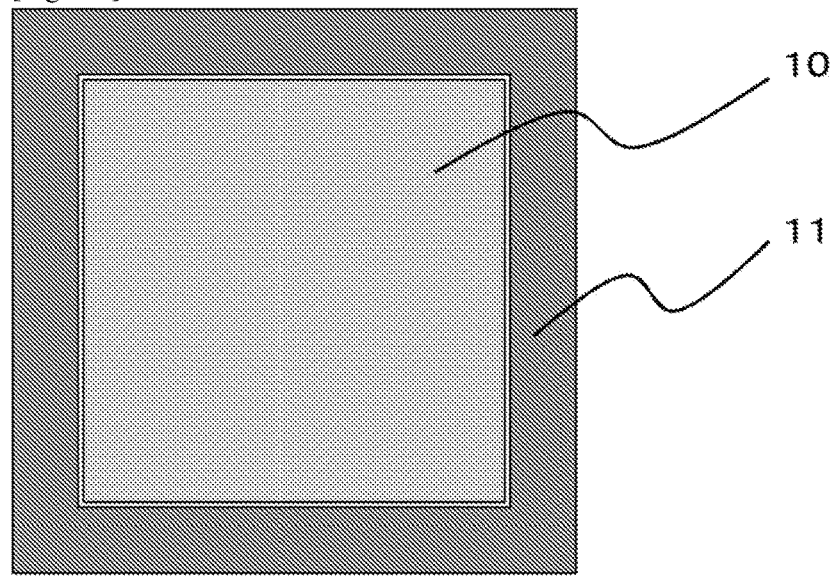
[Fig. 2B]
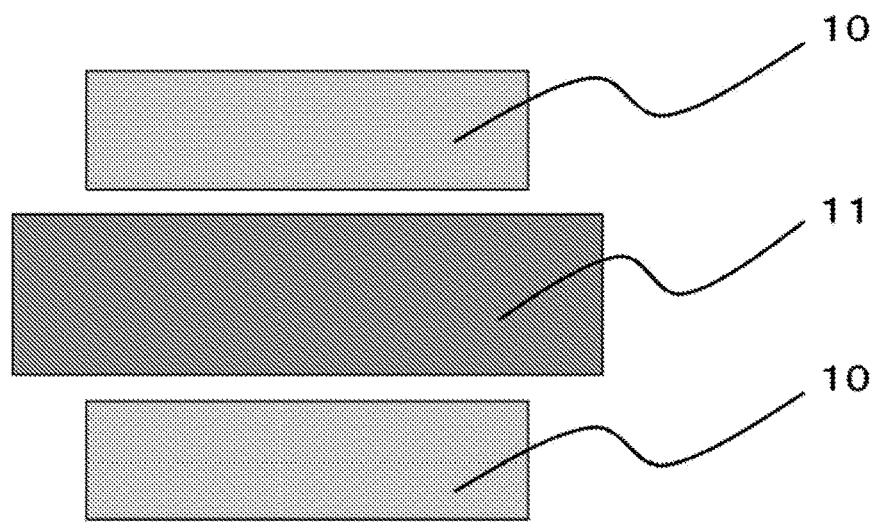

[Fig. 2C]
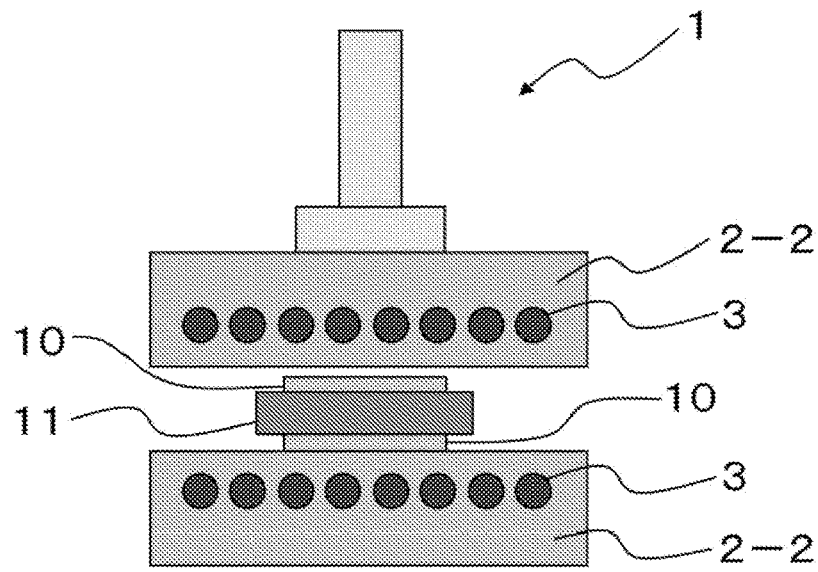
[Fig. 3]
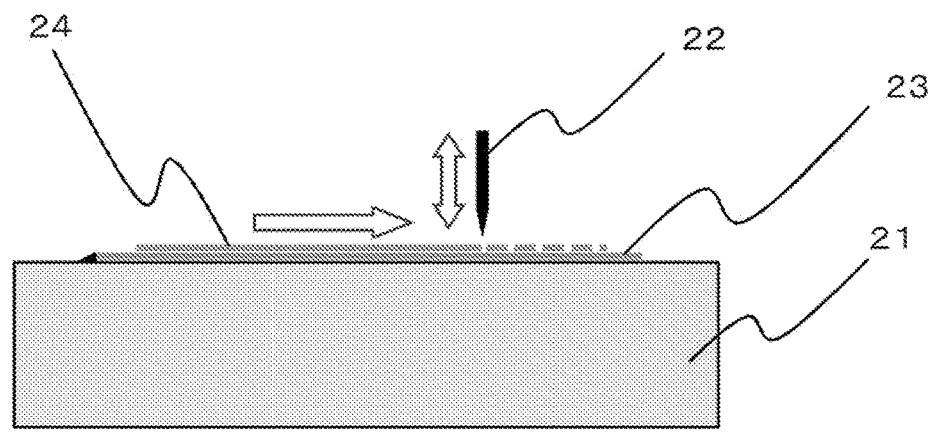
[Fig. 4A]
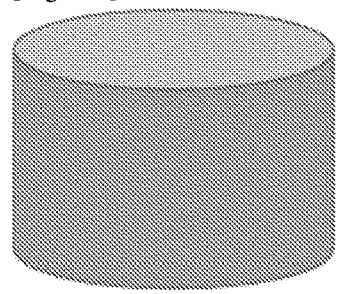
[Fig. 4B]
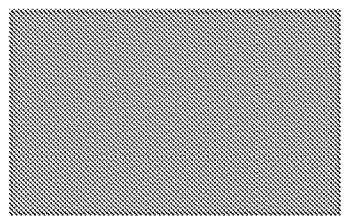

[Fig. 4C]
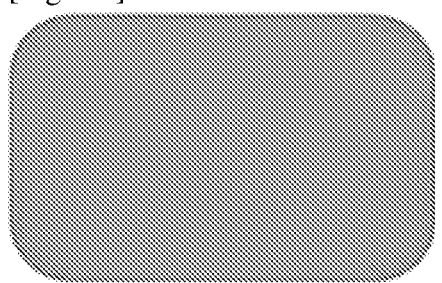
[Fig. 4D]
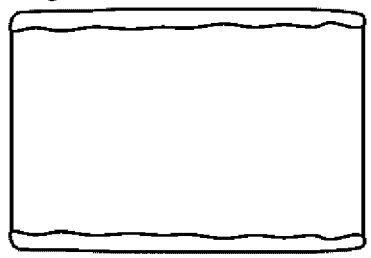
[Fig. 4E]
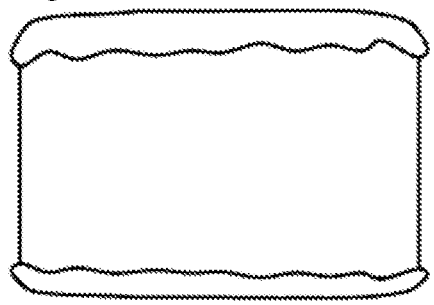
[Fig. 4F]
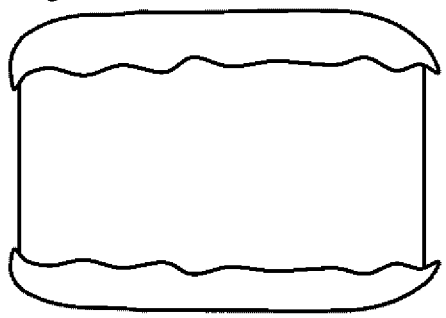
[Fig. 4G]
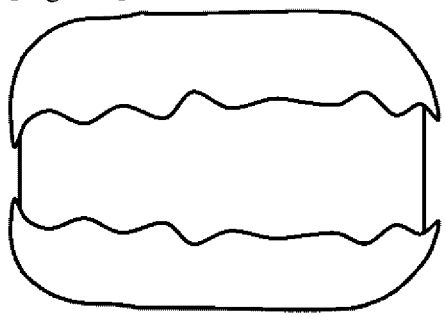

[Fig. 4H]
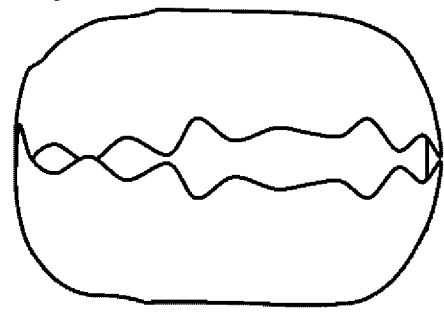
[Fig. 4I]
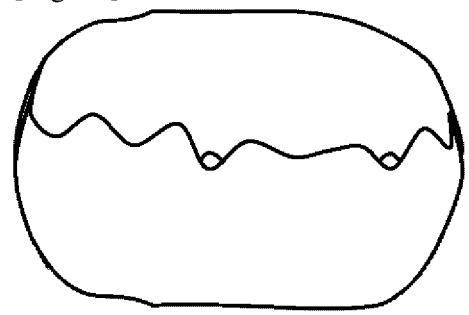
[Fig. 5]
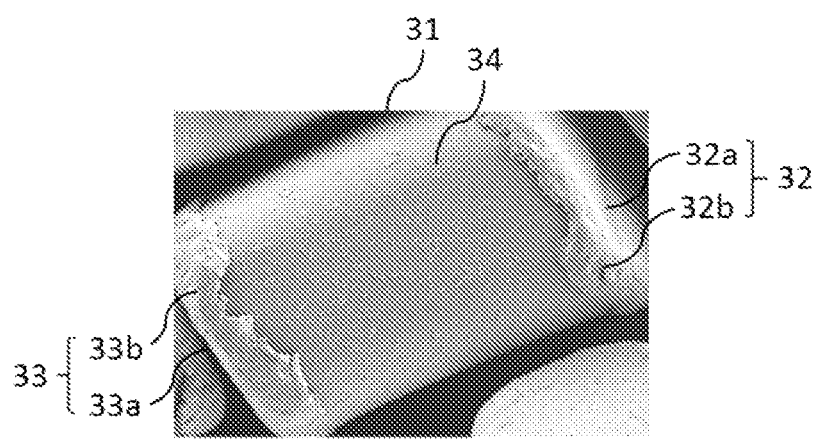

[Fig. 6]
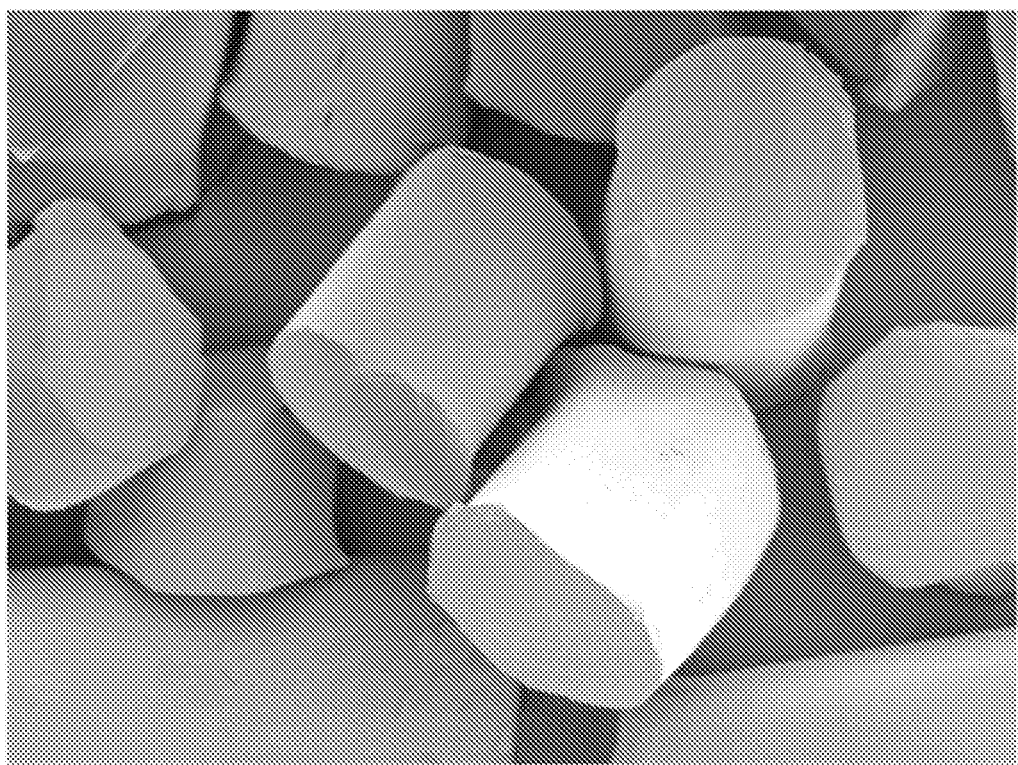
[Fig. 7]
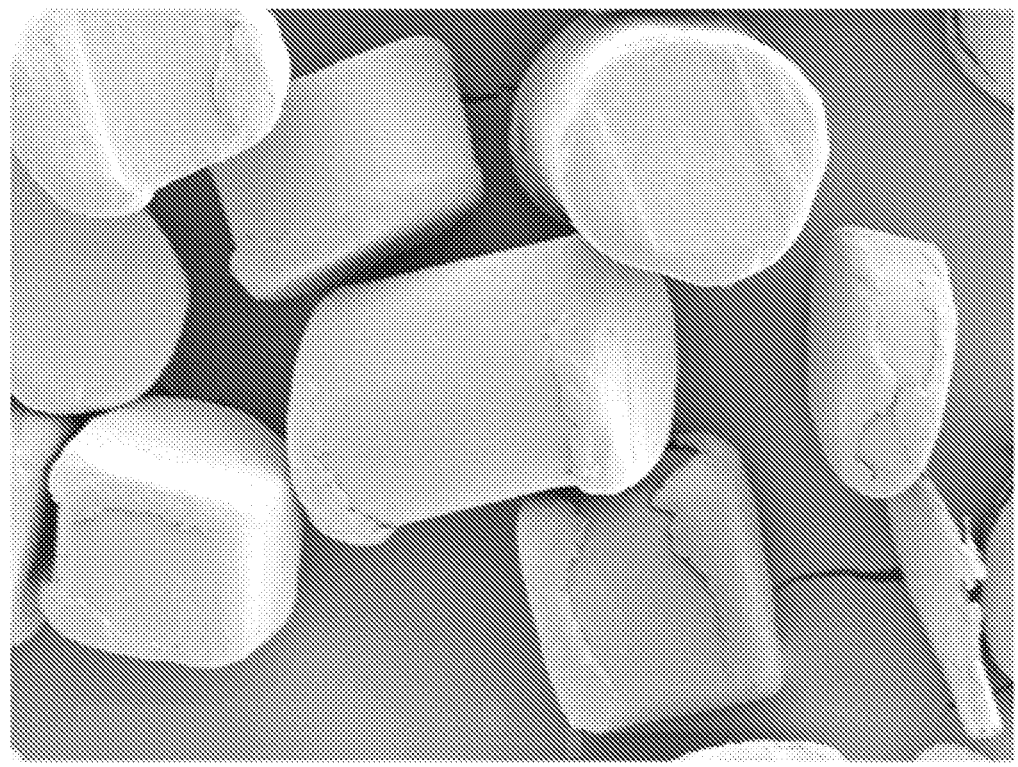

RESIN PARTICLE PRODUCING METHOD

TECHNICAL FIELD

The present disclosure relates to a resin particle producing method.

BACKGROUND ART

As a method for producing resin particles, there has been used a method of bundling long fibers and cutting the obtained bundle of fibers into short fibers to obtain resin particles. Hitherto, as a method for obtaining short fibers, there have been widely known methods and cutting devices for securing a bundle of fibers and cutting the secured bundle of fibers into a length of some millimeters or some centimeters.

For example, as a method for securing fibers, there has been proposed a short fiber producing method of securing a bundle of fibers within an enclosure formed by a sheet-like article, cutting the secured bundle of fibers, and removing the sheet-like article afterwards (for example, see PTL 1).

As a method for obtaining short fibers having a length of a micron order, particularly, a length of 100 micrometers or shorter, there has been proposed a very short fiber producing method of using water as an embedding medium for a bundle of fibers, and solidifying the water to cut the bundle of fibers (for example, see PTL 2). Furthermore, there has been proposed a short fiber producing method of covering a bundle of fibers with a heat shrinkable tube and heat-shrink the heat-shrinkable tube to secure the bundle of fibers, and cutting the bundle of fibers (for example, see PTL 3).

CITATION LIST

Patent Literature

PTL 1: Japanese Patent No. 5300231
PTL 2: Japanese Patent No. 4435738
PTL 3: Japanese Patent No. 4567509

SUMMARY OF INVENTION

Technical Problem

The present disclosure has an object to provide a resin particle producing method capable of cutting long fibers into a length of a micron order and producing at a high production efficiency and at a low cost, resin particles suppressed in fiber length variation and erroneous cutting, having a very sharp particle size distribution, and having an approximately uniform particle shape.

Solution to Problem

According to one aspect of the present disclosure, a resin particle producing method includes a fiber aggregate producing step of directly joining fibers containing a thermoplastic resin with each other to obtain a fiber aggregate and a particle forming step of forming the fiber aggregate into particles to obtain resin particles.

Advantageous Effects of Invention

The present disclosure can provide a resin particle producing method capable of cutting long fibers into a length of a micron order and producing at a high production efficiency and at a low cost, resin particles suppressed in fiber length variation and erroneous cutting, having a very sharp particle size distribution, and having an approximately uniform particle shape.

BRIEF DESCRIPTION OF DRAWINGS

FIG. 1 is a schematic view illustrating an example of a heat press machine.
FIG. 2A is a schematic top view of an example of a die used in the present disclosure.
FIG. 2B is a schematic side view of an example of a die used in the present disclosure.
FIG. 2C is a schematic view illustrating a state of an example of a die used in the present disclosure being set in a heat press machine.
FIG. 3 is a schematic view illustrating an example of a cutting device used in a cutting step of the present disclosure.
FIG. 4A is a schematic perspective view illustrating an example of an approximately cylindrical particle.
FIG. 4B is a side view of the approximately cylindrical particle of FIG. 4A.
FIG. 4C is a side view illustrating an example of a vertex-free shape of an approximately cylindrical particle.
FIG. 4D is a side view illustrating another example of a vertex-free shape of an approximately cylindrical particle.
FIG. 4E is a side view illustrating another example of a vertex-free shape of an approximately cylindrical particle.
FIG. 4F is a side view illustrating another example of a vertex-free shape of an approximately cylindrical particle.
FIG. 4G is a side view illustrating another example of a vertex-free shape of an approximately cylindrical particle.
FIG. 4H is a side view illustrating another example of a vertex-free shape of an approximately cylindrical particle.
FIG. 4I is a side view illustrating another example of a vertex-free shape of an approximately cylindrical particle.
FIG. 5 is an image illustrating an example of a vertex-free approximately cylindrical particle.
FIG. 6 is a view illustrating a result of scanning electron microscopic observation of resin particles of Example 2.
FIG. 7 is a view illustrating a result of scanning electron microscopic observation of resin particles of Example 3.

DESCRIPTION OF EMBODIMENTS (Resin Particle Producing Method)
A resin particle producing method of the present disclosure includes a fiber aggregate producing step of directly joining fibers containing a thermoplastic resin with each other to obtain a fiber aggregate and a particle forming step of forming the fiber aggregate into particles to obtain resin particles, preferably includes a flattening step, a separating step, and a conglobating step, and further includes other steps such as a setting step as needed.

The fiber aggregate producing step preferably includes a heat press step of applying heat press to the plurality of fibers.

The resin particle producing method of the present disclosure may be a method including a producing step of obtaining a plate-shaped fiber aggregate from fibers containing a thermoplastic resin, and a particle forming step of forming the fiber aggregate into particles to obtain resin particles.

The resin particle producing method of the present disclosure is based on the following finding. Among existing resin particle producing methods, methods for obtaining short fibers having a length of a micron order, particularly, a length of 150 micrometers or shorter have been able to obtain fibers having a relatively short length but with cutting length variation, mixing of long fibers, and frequent erroneous cutting such as diagonal cutting and redundant cutting, and have had a problem of extreme difficulty obtaining uniform resin particles due to variation in the particle size distribution and particle shape.

Fiber length variation and erroneous cutting such as redundant cutting are due to fluctuation of a bundle of fibers during cutting of the fibers. The present inventors have found what matters for preventing these troubles and obtaining resin particles stably is to firmly secure the bundle of fibers during cutting of the fibers.

The methods proposed in Japanese Patent Nos. 4435738 and 4567509 (PTL 2 and PTL 3) are effective because the methods can secure a bundle of fibers. Particularly, the method proposed in Japanese Patent No. 4435738 (PTL 2) using water as an embedding medium enables a high securing force for securing a bundle of fibers, and can reduce fiber length variation and erroneous cutting such as redundant cutting. Moreover, the method needs not use a binder component in order to secure the fibers, and allows easy removal of a sheet used for securing after cutting. Therefore, the method is also suitable for avoiding inclusion of impurities.

However, the present inventors have found that these methods have a low production efficiency and are costly, and have a significant problem in practical use in the case of a resin having a high water absorbency because of, for example, poor properties (for example, a flow property) to be imparted to the particles to be obtained due to water adsorption. This problem is partly due to limitation of the amount of fibers bundled for cutting the fibers. If it is possible to secure a large amount of fibers and cut the fibers at a time, a high production efficiency and cost reduction will be obtained. However, the existing methods, which enable securing though, have a low production efficiency because the amount of fibers that can be cut at a time is limited, and need a long production term, which has been a major factor that inhibits wide use. There is another productivity reducing factor, which is a high need for time and thermal energy for water removal and drying.

The securing methods using foreign matters as in Japanese Patent Nos. 5300231 and 4567509 (PTL 1 and PTL 3) tend not to have erroneous cutting because of an excellent securing force, but on the other hand, have a significant problem in separation of the cut particles from the securing component. Therefore, these methods have a low production efficiency and have difficulty overcoming contamination in powders. U.S. Pat. No. 7,794,647 also proposes formation of fibers into particles, but does not mention a fiber aggregate producing method, which is the feature of the present disclosure, and has turned out to be unable to provide a particle size distribution and fluidity needed by the present inventors.

The method of securing fibers by clamping with, for example, a clamp as described in International Publication No. WO 2017/112723 has an instable securing force, and results in frequent diagonal cutting, leading to particles having cutting width unevenness and a drawn cross-sectional shape as illustrated in FIG. 2a and FIG. 2b of the Publication. Hence, it has turned out that the particles have a wide particle size distribution and a poor fluidity.

The resin particle producing method of the present disclosure is based on the discovery of these problems in the existing resin particle producing methods by the present inventors.

<Fiber Aggregate Producing Step>

The fiber aggregate producing step is a step of directly joining fibers containing a thermoplastic resin with each other to obtain a fiber aggregate.

The step of obtaining the fiber aggregate is not limited to the step of directly joining fibers containing a thermoplastic resin with each other, but may be, for example, a step of setting fibers containing a thermoplastic resin in a manner that longer sides of the fibers are in parallel with each other to shape the fibers into a plate shape. That is, the fiber aggregate producing step may be a step of obtaining a plate-shaped fiber aggregate from fibers containing a thermoplastic resin. In this way, the fibers are closely attached to each other and can be firmly secured, making it possible to suppress erroneous cutting.

The fiber aggregate producing step preferably includes a heat press step of applying heat press to the plurality of fibers. The fiber aggregate producing step preferably further includes a step (fiber aggregate flattening step) of flattening the obtained fiber aggregate by temperature or pressure control after the heat press step.

<<Heat Press Step>>

The heat press step is preferably a step of applying heat press to the plurality of fibers (a bundle of long fibers) that are set in a manner that the longer sides of the fibers containing a thermoplastic resin are in parallel with each other, to attach the fibers to each other and obtain a fiber aggregate formed of the fibers. Through the heat press step, a fiber aggregate in which the fibers are directionally uniform and the fibers are directly joined with each other can be obtained. The heat press step is also referred to as thermal press step or hot press step.

The fiber aggregate producing step can produce a fiber aggregate in which the fibers are directly joined with each other. Because the fibers can be directly joined with each other, there occurs a high securing force between the fibers, enabling highly accurate formation of particles in the later particle forming step of the fiber aggregate, leading to resin particles having a very sharp particle size distribution.

Moreover, the fiber aggregate producing step can directly join the fibers with each other and needs not use any other material such as an adhesive or a resin. Use of any other material for securing the fibers may result in inclusion of impurities in the resin particles or a poor accuracy in the particle forming step of the fiber aggregate, leading to a broad particle size distribution or mixing of coarse particles. The fiber aggregate producing step can directly join the fibers with each other without intermediation of any other material, and can obtain resin particles having a very sharp particle size distribution without inclusion of impurities.

The method for applying heat press is not particularly limited and may be appropriately selected depending on the intended purpose. Examples of the method include a method of applying heat press using a commercially available heat press machine, i.e., a press machine with a built-in heating device.

The heat press machine is not particularly limited and may be appropriately selected depending on the intended purpose. Examples of the heat press machine include a hydraulic press-type heat press machine using water or an oil, and a mechanical press-type heat press machine utilizing a mechanical drive mechanism. There are various commercially available products ranging in size from a small size to a large size.

Among these heat press machines, a mechanical press-type heat press machine is preferable because high-speed processing is available and not so high a pressure is needed.

The securing method employed by the heat press machine is not particularly limited and may be appropriately selected depending on the intended purpose. Examples of the securing method include a method of a type of sandwiching a target between hot plates, a method of a roller type of sandwiching a target between two heated rollers and applying heating and pressurization, and a method of a belt conveyor type of sandwiching a target between two steel belt conveyors and applying heating and pressurization.

The heating method of the heat press machine is not particularly limited and may be appropriately selected depending on the intended purpose. Examples of the heating method include an oil heat method, a steam method, a hot water circulating method, and an electrifying method. Among the heat press machines, there are a machine configured to apply press in the atmosphere and a machine that can apply press in a vacuum. The latter type can also be effectively used in the present disclosure.

The heating temperature (press temperature) in the heat press step is not particularly limited, may be appropriately selected depending on the intended purpose, is preferably a temperature at which the thermoplastic resin used softens to make the fibers attach to each other and at which the fibers do not completely fuse and merge with each other, and is specifically preferably a temperature that is higher than or equal to a temperature lower by 100 degrees C. than the melting point of the thermoplastic resin but that is lower than or equal to the melting point, and more preferably a temperature higher than or equal to the crystallization temperature of the thermoplastic resin but lower than or equal to the melting start temperature of the thermoplastic resin. It is also preferable that the heating temperature in the heat press step be higher than or equal to the glass transition point of the thermoplastic resin but lower than or equal to the melting point of the thermoplastic resin.

It is preferable that the heating temperature be within the range, because the fibers attach to each other to impart a sufficient hardness to the fiber aggregate to be obtained, and fiber length variation and erroneous cutting can be reduced. Moreover, the temperature range is also preferable because the fibers do not completely fuse even if the fibers attach to each other's surface, keeping the fibrous shape and making it possible to provide resin particles through cutting. Furthermore, the temperature range is also preferable because the cross-sectional shape of the fibers does not become a completely crushed state.

The pressure (press pressure) in the heat press steps is not particularly limited, may be appropriately selected depending on the intended purpose, and is preferably 0.01 MPa or higher but 20 MPa or lower and more preferably 0.1 MPa or higher but 10 MPa or lower.

It is preferable that the pressure be within the range, because the fibers attach to each other to impart a high hardness to the fiber aggregate to be obtained, and fiber length variation and erroneous cutting can be reduced. Moreover, the pressure range is also preferable because the fibers do not completely fuse, keeping the fibrous state and making it possible to provide resin particles through cutting. Furthermore, the pressure range is also preferable because the cross-sectional shape of the fibers does not become a completely crushed state.

The time (press time) taken by the heat press step is not particularly limited, may be appropriately selected depending on the intended purpose, and is preferably 1 second or longer but 24 hours or shorter, more preferably 1 minute or longer but 6 hours or shorter, and particularly preferably 3 minutes or longer but 30 minutes or shorter.

It is preferable that the time be within the range, because the fibers attach to each other to impart a high hardness to the fiber aggregate to be obtained in the form of a plate shape, and fiber length variation and erroneous cutting can be reduced. Moreover, the time range is also preferable because the fibers do not completely fuse, keeping the fibrous state and making it possible to provide resin particles through cutting. Furthermore, the time range is also preferable because the cross-sectional shape of the fibers does not become a completely crushed state.

The method for measuring the melting point, the crystallization temperature, and the melting start temperature is not particularly limited and may be appropriately selected depending on the intended purpose. Examples of the method include a measuring method employing a differential scanning calorimetry (DSC) method according to ISO 3146 (a plastic transition temperature measuring method, JIS K7121). In the present disclosure, an exothermic peak appearing on a DSC chart is determined as the crystallization temperature, an endothermic peak appearing on an even higher temperature side is determined as the melting point, and an inflection point with a baseline on the lower temperature side of the endothermic peak is determined as the melting start temperature.

—Fibers—

The fibers are fibers containing a thermoplastic resin, may be formed of the thermoplastic resin, or may contain additives such as a fluidizer, a reinforcing agent, a flame retardant, an antioxidant, a plasticizer, a stabilizer, and a crystal nucleating agent in addition to the thermoplastic resin. One kind of a thermoplastic resin may be used alone or two or more kinds of thermoplastic resins may be used in combination.

The content of the thermoplastic resin in the fibers is not particularly limited, may be appropriately selected depending on the intended purpose, and is preferably 50% by mass or higher, more preferably 75% by mass or higher, and may be 100% by mass. The additives may be mixed with the thermoplastic resin before formation of the fibers, or may be mixed after resin particles are obtained.

—Thermoplastic Resin—

The thermoplastic resin is the generic term of resins that soften to have plasticity in response to heating and solidify in response to cooling.

The thermoplastic resin is not particularly limited and may be appropriately selected depending on the intended purpose. Examples of the thermoplastic resin include: polymers such as polyolefin, polyamide, polyester, polyether, polyaryl ketone, liquid crystal polymers (LCP), polyacetal (POM), polyimide, fluororesins, and polyphenylene sulfide; crystalline resins; and non-crystalline resins. One of these thermoplastic resins may be used alone or two or more of these thermoplastic resins may be used in combination.

Examples of the polyolefin include polyethylene and polypropylene. One of these polyolefins may be used alone or two or more of these polyolefins may be used in combination.

Examples of the polyamide include polyamide 410 (PA410), polyamide 6 (PA6), polyamide 66 (PA66), polyamide 610 (PA610), polyamide 612 (PA612), polyamide 11 (PA11), and polyamide 12 (PA12); semiaromatic polyamides such as polyamide 4T (PA4T), polyamide MXD6 (PAMXD6), polyamide 6T (PA6T), polyamide 9T (PA9T), and polyamide 10T (PA10T). One of these polyamides may be used alone or two or more of these polyamides may be used in combination.

Examples of the polyester include polyethylene terephthalate (PET), polybutadiene terephthalate (PBT), and polylactic acid (PLA). An aromatic series-containing polyester partially containing terephthalic acid or isophthalic acid can also be suitably used in order to impart heat resistance.

Examples of the polyether include polyether ether ketone (PEEK), polyether ketone (PEK), polyether ketone ketone (PEKK), polyaryl ether ketone (PAEK), polyether ether ketone ketone (PEEKK), and polyether ketone ether ketone ketone (PEKEKK).

Examples of the crystalline resin include polyacetal, polyimide, and polyether sulfone.

The crystalline resin refers to a resin that has a melting peak when measured according to ISO 3146 (a plastic transition temperature measuring method, JIS K7121).

The thermoplastic resin is not particularly limited and may be appropriately selected depending on the intended purpose. A resin that has a melting point of 100 degrees C. or higher when measured according to ISO 3146 is preferable. The melting point can be measured by a differential scanning calorimetry (DSC) method according to ISO 3146 (a plastic transition temperature measuring method, JIS K7121). When a plurality of melting points are present, the higher melting point is to be employed.

As the crystalline resin, a crystallinity-controlled crystalline thermoplastic resin is preferable. A crystalline thermoplastic resin with a controlled crystal size or a controlled crystalline orientation can be obtained by a method for applying an external stimulus, such as a thermal treatment, drawing, a crystal nucleating agent, and an ultrasonic treatment.

Among such crystallinity-controlled crystalline thermoplastic resins, a drawn crystalline thermoplastic resin is preferable. Because the resin particle producing method of the present disclosure includes the fiber aggregate producing step and the particle forming step of the fiber aggregate, use of fibers containing a previously drawn crystalline thermoplastic resin is preferable because crystalline resin particles can be obtained. According to existing resin particle producing methods, it is difficult to obtain crystalline resin particles. Therefore, in the present disclosure, it is effective to control the crystallinity of the thermoplastic resin by the method described above, particularly, drawing during formation of fibers from the thermoplastic resin, and use the fibers for producing resin particles. The resin particles of the present disclosure are not limited to crystalline resin particles, and may be non-crystalline resin particles.

Examples of the drawing include a method of drawing a resin melt to a fibrous shape with an extruder while stirring the resin melt at a temperature higher by, for example, 30 degrees C. or more than the melting point. Specifically, the resin melt can be drawn by about 1 time or greater but 10 times or less to have a fibrous shape. Here, the shape of a nozzle opening of the extruder can determine the cross-sectional shape of a fiber and the diameter the fiber. As the number of nozzle openings is greater, a higher productivity can be expected.

—Additives—

The additives are not particularly limited and known additives may be appropriately selected depending on the intended purpose. Examples of the additives include an antioxidant, a fluidizer, a reinforcing agent, a flame retardant, a plasticizer, a stabilizer, and a crystal nucleating agent.

The antioxidant is not particularly limited and may be appropriately selected depending on the intended purpose. The antioxidant encompasses a so-called deterioration inhibitor and a stabilizer. Examples of the antioxidant include: hydrazide-based compounds and amide-based compounds, which are metal deactivators; phenol-based compounds (hindered phenol-based compounds) and amine-based compounds, which are radical scavengers; phosphate-based compounds and sulfur-based compounds, which are peroxide decomposers; and triazine-based compounds, which are ultraviolet absorbers. One of these antioxidants may be used alone or two or more of these antioxidants may be used in combination.

Among these antioxidants, a combination of a radical scavenger and a peroxide de-composer is preferable in terms of the antioxidant effect.

It is preferable to previously mix the antioxidant in the fibers in terms of suppressing deterioration of the resin particles.

The content of the antioxidant is preferably 0.05% by mass or greater but 5% by mass or less, more preferably 0.1% by mass or greater but 3% by mass or less, and yet more preferably 0.2% by mass or greater but 2% by mass or less relative to the total amount of the resin particles. When the content of the antioxidant is within the range described above, an effect of preventing thermal deterioration can be obtained. An effect of preventing thermal discoloration can also be obtained.

The fluidizer is used in order to enhance the fluidity of the obtained resin particles by coating part or the whole of the surface of the resin particles. It is preferable that the fluidizer be attached to the surface of the resin particles. It is more preferable to attach the fluidizer to the surface of the resin particles by mixing and stirring the fluidizer with the resin particles.

The average primary particle diameter of the fluidizer is preferably 500 nm or less and more preferably 50 nm or less. This makes it possible to increase the coverage of the fluidizer on the surface of the resin particles and improve the fluidity. The average primary particle diameter can be measured with, for example, a particle size distribution measuring instrument (instrument name: MICROTRAC MT3300EXII, available from Microtrac Bel Corp.).

The fluidizer is not particularly limited and may be appropriately selected depending on the intended purpose. It is preferable to use spherical particles formed of an inorganic material. It is particularly preferable to use a metal oxide. Examples of the metal oxide include silica, alumina, titania (titanium dioxide), zinc oxide, magnesium oxide, tin oxide, iron oxide, and copper oxide. Among these metal oxides, silica and titania are more preferable. One of these metal oxides may be used alone or two or more of these metal oxides may be used in combination.

It is preferable to use a superficially hydrophobized fluidizer. The method for hydrophobization is not particularly limited and a hitherto known method can be used. Examples of a hydrophobizing agent include silane coupling agents such as hexylmethyl disilazane (HMDS) and dimethyl dichlorosilane (DMDS), and silicone oil treating agents such as dimethyl silicone oil and amino-modified silicone oil. Among these hydrophobizing agents, silane coupling agents are preferable. The amount of treatment with the hydrophobizing agent is preferably 2 mg/m$^2$ or greater but 6 mg/m$^2$ or less per surface area of a particle.

The content of the fluidizer is preferably 0.05% by mass or greater but 3% by mass or less and more preferably 0.1% by mass or greater but 1.5% by mass or less relative to the total amount of the resin particles. When the content of the fluidizer is within the range described above, the fluidity of the resin particles can be improved. In the step of mixing the fluidizer with the resin particles to coat the resin particles with the fluidizer, a hitherto known mixer or stirrer is used. A mixer or stirrer mounted with, for example, a jacket to enable internal temperature adjustment is preferable. For example, the rotation number, speed, time, and temperature of the mixer may be arbitrarily changed. Examples of such a powder mixer include a V-type mixer, a Henschel mixer, a rocking mixer, a nauta mixer, and a super mixer.

The reinforcing agent is added in order to mainly increase strength, and added as a filler or a filling material. For example, fibers or beads are suitably used. The fibers or beads are not particularly limited and may be appropriately selected depending on the intended purpose. Examples of the fibers or beads include glass fibers, glass beads, carbon fibers, metal fibers, metal beads, and nanocomposites. One of these reinforcing agents may be used alone or two or more of these reinforcing agents may be used in combination. The reinforcing agent may be mixed with the resin or may be embedded in the resin.

The average fiber diameter of the reinforcing agent is preferably 1 micrometer or greater but 30 micrometers or less, and the average fiber length of the reinforcing agent is preferably 30 micrometers or greater but 500 micrometers or less. The average fiber diameter and the average fiber length that are within the ranges described above are effective for increasing the strength of the resin particles obtained using a fiber aggregate. The content of the reinforcing agent is preferably 5% by mass or greater but 60% by mass or less relative to the total amount of the resin particles. When the content of the reinforcing agent is within the range described above, an effect of increasing the strength is sufficiently exhibited.

The nanocomposites can exhibit the same effect even with an average fiber diameter of 1 micrometer or less.

The flame retardant can be suitably used in materials that need treatment for fire defense, such as building materials, materials for automobiles, and ship rigging materials. Examples of the flame retardant include: halogen-based, phosphorus-based, inorganic hydrated metal compound-based, nitrogen-based, and silicone-based flame retardants; and inorganic reinforcing agents. One of these flame retardants may be used alone or two or more of these flame retardants may be used in combination. In the case of using two or more of the flame retardants in combination, a combination of a halogen-based flame retardant and an inorganic hydrated metal compound-based flame retardant is preferable because flame retardancy can be increased.

Examples of the inorganic reinforcing agent include: inorganic fibrous substances such as glass fiber, carbon fiber, and aramid fiber; and inorganic layered silicates such as talc, mica, and montmorillonite. Addition of the inorganic reinforcing agent is preferable because this can also improve flame retardancy and can achieve both of reinforcement of physical properties and enhancement of flame retardancy simultaneously.

The flame retardancy of the resin particles can be evaluated according to, for example, JIS K6911, JIS L1091 (ISO 6925), JIS C3005, and a heat generation test (cone calorimeter).

The content of the flame retardant is preferably 1% by mass or greater but 50% by mass or less relative to the total amount of the resin particles, and is more preferably 10% by mass or greater but 30% by mass or less relative to the total amount of the resin particles because flame retardancy can be increased. When the content of the flame retardant is within the range described above, a sufficient flame retardancy can be realized.

—Fiber Aggregate—

The fiber aggregate is an aggregate of fibers obtained by directly joining fibers containing the thermoplastic resin with each other.

The shape of the fiber aggregate is not particularly limited and may be appropriately selected depending on the intended purpose. A plate shape is preferable. A plate shape with little warpage is more preferable. A plate shape having a hardness that does not let the shape easily collapse in response to an external force is more preferable.

As described above, the resin particles obtained by the resin particle producing method of the present disclosure are suppressed in fiber length variation and erroneous cutting such as redundant cutting, and have an approximately uniform fiber length and an approximately uniform particle shape. In order to obtain such resin particles, it is preferable to produce a fiber aggregate that is hard enough not to bend when held in a hand, by making the fibers attach to each other in the fiber aggregate producing step. It is more preferable to produce a plate-shaped fiber aggregate having such a property.

If the fiber aggregate obtained in the fiber aggregate producing step has a softness that would let the fiber aggregate bend when held in a hand or sink when pressed by a hand, the fibers may stagger in response to a cutting blade during cutting, resulting in increase in fiber length variation, mixing of long fibers, or frequent erroneous cutting such as diagonal cutting and redundant cutting. This is largely due to a weak attachment between the fibers or a large area of unattachment between the fibers. Firm attachment of the fibers is effective for improving the quality of the resin particles.

In order to improve the quality of the resin particles, it is effective to directly join the fibers with each other in the fiber aggregate producing step. On the other hand, complete fusing and merging of the fibers is unpreferable, because the cut product may not be taken out in the form of resin particles. If the fiber aggregate obtained in the heat press step has a transparent region, there is a possibility that the transparent region may undergo further melting to make it impossible to collect separate particles. Therefore, it is preferable to have control so as to stop melting before transparentization.

<<Fiber Aggregate Flattening Step>>

The fiber aggregate flattening step is a step of flattening the obtained fiber aggregate by temperature or pressure control.

What also matters for the plate-shaped fiber aggregate in addition to hardness is that the plate-shaped fiber aggregate has no warpage. With a large warpage, the plate-shaped fiber aggregate may fluctuate in the particle forming step of the fiber aggregate, leading to increase in erroneous cutting. Therefore, in order to obtain resin particles having a uniform resin particle size with suppressed erroneous cutting, it is preferable to produce a warpage-free, flat fiber aggregate that is hard enough not to allow the plate-shaped fiber aggregate to bend or sink.

The hardness and warpage of the plate-shaped fiber aggregate can be controlled based on heat press conditions in the heat press step, such as heating temperature, pressure, and time.

FIG. 1 is a schematic view illustrating an example of a common heat press machine. The heat press machine 1 includes a pair of upper and lower hot plates 2-1 and 2-2. The hot plates include a built-in heater 3 for heating. In actual heat press, for example, the hot plate 2-1 is once moved upward, the fibers are arranged side by side on the hot plate 2-2 in a manner to be aligned in the same direction with each other, and the hot plate 2-1 is moved downward, for applying press at a predetermined temperature, at a predetermined pressure, and for a predetermined time. Subsequently, the hot plate 2-1 is moved upward, and the pressed fiber aggregate (plate-shaped fiber aggregate) can be taken out.

Because press is applied to the fiber aggregate under heating in the heat press step, the fibers attach to each other and a fiber aggregate that is hard enough not to bend or sink when bent or pressed by a hand can be obtained. In the subsequent cutting step, what is cut is this fiber aggregate, which a cutting blade can cut without staggering the fibers, making it possible to provide resin particles suppressed in fiber length variation and erroneous cutting.

The fiber aggregate producing step, particularly, the heat press step is effective for a high production efficiency and cost reduction, because a highly dense fiber aggregate can be obtained very easily through the step.

Existing resin particle producing methods take a lot of time for securing the fibers and have not been able to obtain such a high density. In the present disclosure, it is possible to secure fibers in a short time easily at a high density, and to achieve improvement of both of quality and productivity of the resin particles.

Further, in the fiber aggregate producing step, there is no need for separately adding a material for securing the fibers. In the case of using, for example, an adhesive, a sheet, or a tube as a securing material as in the existing resin particle producing methods, there is a risk that the securing material may remain as a residue and degrade the quality of the resin particles to be obtained. There is also a risk that the remaining material may cause troubles when the resin particles are used (for example, for 3D modeling). Further, there is a need for further providing a step of removing the material, leading to production efficiency degradation and cost increase.

In applying press using the heat press machine, the fibers in the bundle may be arranged side by side directly on the press machine, but it is more preferable to use a release paper or a die in combination.

By setting the release paper above and below the bundle of fibers to be pressed, it is possible to prevent the fibers from adhering to the press machine after press.

The die is not particularly limited, and a hitherto known die may be appropriately selected depending on the intended purpose. The die illustrated in FIG. 2A to FIG. 2C is preferable. FIG. 2A is a top view of the die, and FIG. 2B is a side view of the die. The die illustrated in FIG. 2A to FIG. 2C includes two plates 10 and one die frame 11. The two plates both have a size that can fall within the die frame 11. Press is applied in a state that the fibers in the bundle are arranged side by side between the two plates. FIG. 2C is a schematic view illustrating a state of the die being set in the heat press machine. The material of the die frame and plates of the die is preferably a metal, and more preferably iron, steel, aluminum, or an alloy of these metals.

Use of the die is preferable because an aggregate of the long fibers can be uniform in thickness. Without the die, the fibers tend to collapse and fall outside, and a thin portion formed where some fibers are lost due to the falling may have a weak attachment between fibers after press and may be soft or undergo loosening of fibers, to make the fiber aggregate likely to collapse. As a result, the fibers may stagger largely during cutting, leading to increase in fiber length variation and erroneous cutting and degradation of the quality of the resin particles.

Use of the die is also effective for preventing the fiber aggregate from non-uniformly undergoing rapid cooling after press. If the fiber aggregate is rapidly cooled non-uniformly after press, the fiber aggregate formed of the bundle of fibers may warp, leading to increase in fiber length variation and erroneous cutting. Therefore, in order to reduce fiber length variation and erroneous cutting and obtain resin particles having a sharp particle size distribution, what matters is that the fiber aggregate obtained in the fiber aggregate producing step is hard enough not to be broken by a hard and has no warpage. From these points of view, use of the die is effective.

<Particle Forming Step of Fiber Aggregate>

The particle forming step of the fiber aggregate is a step of forming the fiber aggregate into particles to obtain resin particles.

<<Cutting Step>>

The particle forming step of the fiber aggregate preferably includes a cutting step of cutting the fiber aggregate. The cutting direction is preferably a direction which is as close as possible to the direction perpendicular to the longer-axis direction of the fibers.

The cutting method is not particularly limited and an existing method may be appropriately selected depending on the intended purpose so long as the method can cut the fiber aggregate and produce resin particles. Examples of a cutting device suitable for use include a commercially available cutting machine or cutting device that can perform cutting at a high speed and highly accurately. As the cutting machine, there are various commercially available products ranging in size from a large size to a small size, and various types are lined up depending on the intended purpose, such as an automatic type and a manual type. Examples of the cutting method of the cutting machine include a press cutting method of moving a cutting blade upward or downward to cut a target, a shear method of cutting a target based on a shear force due to two blades including a movable upper blade and a fixed lower blade, and a rotary method of providing a plurality of cutting blades and rotating the cutting blades to cut a target. Any device and any cutting method can be effectively used.

Because resin particles are produced in the present disclosure, there is a need for cutting the fibers into a very short fiber length of particularly 150 micrometers or less at a high speed and highly accurately. As a cutting machine used for this purpose, a fully automated, press cutting-type cutting machine is preferable among the cutting machines described above. Many of such press cutting-type cutting machines are configured to cut a cutting target with a cutting blade movable upward and downward while feeding the cutting target toward the cutting blade. Such machines are preferable in terms of cutting a target at a high speed highly accurately.

FIG. 3 is a schematic view illustrating an example of a press cutting-type cutting machine that can be suitably used in the cutting step of the present disclosure. The cutting machine 21 includes a cutting blade 22 and a feeding plate 23 configured to move a cutting target toward the cutting blade. A fiber aggregate (a plate-shaped fiber aggregate) 24 obtained in the heat press step is placed and secured on the feeding plate 23.

Here, the feeding plate 23 moves toward the cutting blade 22 by a desired distance, and the cutting blade 22 moves downward and bites into the plate-shaped fiber aggregate 24 placed on the feeding plate 23 to cut the plate-shaped fiber aggregate 24. Subsequently, the cutting blade 22 moves upward, the feeding plate 23 moves toward the cutting blade 22 by a desired distance again, and the cutting blade 22 moves downwards. Through repetition of this process, the plate-shaped fiber aggregate 24 is cut finely, to produce the resin particles of the present disclosure.

The cutting blade used in the cutting step is not particularly limited, and a hitherto known cutting blade may be appropriately selected depending on the intended purpose.

<Separating Step>

The separating step is a step of separating the resin particles adhering to each other. In the present disclosure, when heat press is applied to the fibers to produce the fiber aggregate, resin particles may be obtained from cutting in a mutually adhering state depending on the heat press conditions. In this case, it is preferable to perform the separating step to separate the resin particles adhering to each other.

The separating method is not particularly limited and a hitherto known method may be appropriately selected depending on the intended purpose, so long as the method can separate from each other the resin particles in a mutually adhering state obtained from the cutting step and obtain the resin particles in the form of particles. Examples of the separating method include a separating method using a separating device including, for example, a pulverizing unit, a cracking unit, a classifying device, and a mixer.

Examples of the separating device include a fluidized bed-type jet mill, a swirling flow-type jet mill, a centrifugal air sifter, a stirring pulverizer, a shearing pulverizer, an impact grinder, a conical mixer, a shearing mixer, a continuous mixer, a vibration mill, and an ultrasonic mill.

In the heat press step, it is preferable that the fibers attach to each other. However, a completely fused and merged state is unpreferable. When the fibers superficially attach to each other, it is relatively easy to crack the resin particles adhering to each other using the separating unit, without applying a large mechanical shear.

<Conglobating Step>

The conglobating step is a step of conglobating the resin particles.

The conglobation means increasing the circularity of the resin particles. The circularity is an indicator of closeness to a circle. A circularity of 1 means the maximum closeness to a circle. As the circularity, an arithmetic mean value of circularities that are measured according to a formula (1) below can be used, where in formula (1), S represents an area (number of pixels) and L represents a perimeter.

$$\text{Circularity} = 4\pi S/L^2 \quad \text{Formula (1)}$$

As a method for easily obtaining the circularity, for example, it is possible to quantify the circularity by a measurement using a wet flow-type particle diameter/profile analyzer (instrument name: FPIA-3000, available from Sysmex Corporation). The wet flow-type particle diameter/profile analyzer can capture images of particles contained in a suspension flowing in a glass cell with a CCD at a high speed and analyze individual particle images in real time. It is possible to easily obtain the circularity, using such an instrument that captures images of particles and performs image analyses.

The conglobating step may be used in order to increase the circularity of the resin particles and further enhance the fluidity. In this case, it is preferable to perform the conglobating step in the presence of additives such as a fluidizer.

As the unit or device to be used in the conglobating step, the unit or device used in the separating step can be used. In the separating step, a mechanical shear is relatively low because a mechanical shear is utilized in order to separate the resin particles adhering to each other. In the conglobating step, it is more effective to apply a higher mechanical shear than in the separating step.

In the present disclosure, it is possible to perform the separating step and the conglobating step simultaneously.

—Additives—

The additives are not particularly limited and known additives may be appropriately selected depending on the intended purpose. Examples of the additives include a fluidizer, a reinforcing agent, a flame retardant, an antioxidant, a plasticizer, a stabilizer, and a crystal nucleating agent. Among these additives, a fluidizer is preferable in terms of enhancing the fluidity of the resin particles.

In the conglobating step, it is possible to increase the bulk density of the resin particles, by increasing the circularity of the resin particles to remove the vertices of the resin particles having a columnar shape with a bottom surface and a top surface. Here, the vertices refer to the corner portions present on a columnar body.

The shape of the resin particles having a columnar shape (columnar particles) will be described with reference to FIG. 4A to FIG. 4I. FIG. 4A is a schematic perspective view illustrating an example of an approximately cylindrical particle. FIG. 4B is a side view of the approximately cylindrical particle of FIG. 4A. FIG. 4C is a side view illustrating an example of a vertex-free shape of an approximately cylindrical particle. FIG. 4D to FIG. 4I are side views each illustrating another example of a vertex-free shape of an approximately cylindrical particle.

When the approximately cylindrical body illustrated in FIG. 4A is observed from a side, the approximately cylindrical body has a rectangular shape as illustrated in FIG. 4B, and has corner portions, i.e., vertices at four positions. Presence or absence of vertices on a columnar particle can be judged based on a projected image of the side surface of the columnar particle. For example, the side surface of the columnar particle is observed with, for example, a scanning electron microscope (instrument name: S4200, available from Hitachi, Ltd.), to capture the side surface in the form of a two-dimensional image. In this case, the projected image has a quadrangular shape. When a portion formed by adjacent two sides is referred to as an end portion, a portion formed only by adjacent two straight lines has a corner, which is a vertex. As in FIG. 4C to FIG. 4I, an end portion formed by an arc does not have a vertex.

FIG. 5 is an image illustrating an example of a vertex-free approximately cylindrical particle.

FIG. 5 is an image obtained by SEM (scanning electron microscope) observation.

As illustrated in FIG. 5, a columnar body 31 has a first surface 32, a second surface 33, and a side surface 34. The first surface 32 includes a first facing surface 32a and an outer circumferential region 32b of the first surface 32, where the outer circumferential region 32b has a shape extending along the side surface 34. The outer circumferential region 32b of the first surface 32 is a surface continuous from the first facing surface 32a via a curved surface, and is approximately orthogonal to the first facing surface 32a. The second surface 33 includes a second facing surface 33a facing the first facing surface 32a and an outer circumferential region 33b of the second surface 33, where the outer circumferential region 33b has a shape extending along the side surface 34. The outer circumferential region 33b of the second surface 33 is a surface continuous from the second facing surface 33a via a curved surface, and is approximately orthogonal to the second facing surface 33a. The side surface 34 adjoins the first surface 32 and the second surface 33. The outer circumferential region 32b of the first surface 32 and the outer circumferential region 33b of the second surface 33 extend over the side surface 34.

The shape of the outer circumferential region 32b of the first surface 32 and the outer circumferential region 33b of the second surface 33 (hereinafter, may also be referred to as "outer circumferential region") needs at least to be a shape distinguishable from the side surface 34 in a SEM image, and such a shape encompasses a shape in which part of the outer circumferential region is integrated with the side surface 34, a shape in which the outer circumferential region contacts the side surface 34, and a shape in which a space is present between the outer circumferential region and the side surface 34. It is preferable that the outer circumferential region 32b of the first surface 32 and the outer circumferential region 33b of the second surface 33 be provided to have an in-plane direction approximately equal to the in-plane direction of the side surface 34.

As illustrated in FIG. 5, the outer circumferential region 32b of the first surface 32 and the outer circumferential region 33b of the second surface 33 extend along the side surface 34 and are located over the side surface 34. The characteristic structure of the first surface 32 and second surface 33, i.e., the structure of covering the contacting region between the outer circumferential region 32b of the first surface 32 and outer circumferential region 33b of the second surface 33 and the side surface 34 is also referred to as bottle cap shape.

—Resin Particles—

The volume average particle diameter (Mv) of the resin particles obtained by the resin particle producing method of the present disclosure is not particularly limited, may be appropriately selected depending on the intended purpose, and is preferably 1 mm or less and more preferably 150 micrometers or less. The producing method of the present disclosure is a resin particle producing method that can also produce short fibers. Therefore, it is preferable that the fiber diameter and the fiber length be equal. For example, when the fiber diameter is 1 mm, the fiber length is preferably about 1 mm. When the fiber diameter is 100 micrometers, the fiber length to be obtained by cutting is preferably about 100 micrometers.

The volume average particle diameter (Mv) can be measured with, for example, a particle size distribution measuring instrument (instrument name: MICROTRAC MT3300EXII, available from Microtrac Bel Corp.). The fiber diameter and the fiber length can be obtained based on a result of scanning electron microscopic observation. For example, it is possible to obtain the fiber diameter and the fiber length by capturing two-dimensional images of ten views, measuring the fiber diameter and the fiber length from each, and calculating the averages of the measured fiber diameters and fiber lengths.

The volume average particle diameter/number average particle diameter (Mv/Mn) of the resin particles is preferably 2.00 or less, more preferably 1.50 or less, and particularly preferably 1.20 or less in terms of improving an object producing accuracy.

The number average particle diameter (Mn) can be measured with, for example, a wet flow-type particle diameter/profile analyzer (instrument name: FPIA-3000, available from Sysmex Corporation). It is possible to calculate Mv/Mn based on the Mv and the Mn.

The resin particles obtained by the resin particle producing method of the present disclosure have a suitable balance among parameters such as particle size, particle size distribution, heat transfer characteristics, melt viscosity, bulk density, fluidity, melting temperature, and recrystallization temperature, and are suitably used in various three-dimensional object producing methods using resin particles, such as a SLS (Selective Laser Sintering) method, a SMS (Selective Mask Sintering) method, a MJF (Multi Jet Fusion) method, and a BJ (Binder Jetting) method. In addition, the resin particles obtained by the resin particle producing method of the present disclosure are suitably used in surface modifiers, spacers, lubricants, paints, grindstones, additives, secondary battery separators, foods, cosmetics, and clothes. In addition, the resin particles may also be used as materials or metal substitute materials used in the fields of automobiles, precision machines, semiconductors, aerospace, and medical care.

EXAMPLES

The present disclosure will be described more specifically below by way of Examples. The present disclosure should not be construed as being limited to these Examples.

Example 1

With an extruder (available from Japan Steel Works, Ltd.) with nozzle openings having a circular shape, pellets of a polybutylene terephthalate (PBT) resin (product name: NOVADURAN 5020, available from Mitsubishi Engineering Plastics Corporation, with a glass transition temperature of 43 degrees C. and a melting point of 218 degrees C.) were subjected to drawing after stirred at a temperature higher than the melting point by 30 degrees C., so as to be formed into fibers. With the number of fibers to be discharged from the nozzles set to 60 fibers and the draw ratio set to about 4 times, drawn fibers having a fiber diameter of about 60 micrometers and containing a thermoplastic resin were obtained. The obtained fibers were measured by DSC with an instrument named: DSC Q200 (available from TA Instruments), to find that the crystallization temperature was 191 degrees C., the melting point was 224 degrees C., and the melting start temperature was 218 degrees C.

As a bundle, long fibers obtained by cutting the obtained fibers were arranged side by side within a die in which a metal plate was previously fit within a die frame having a width of about 300 mm, in a manner that the fibers were aligned in the same direction and uniform in thickness. Subsequently, another metal plate was fit into the die frame from above, to sandwich the bundle of long fibers between the two metal plates. Subsequently, the whole of the die was moved into a heat press machine (machine name: KU-HCP 33, available from Kobayashi Kikai Kogyo Co., Ltd.).

The heat press machine was set to a temperature of 200 degrees C. and a pressure of 1 MPa to apply heat press for 10 minutes, to obtain a plate-shaped fiber aggregate formed of the fibers. After heat press, by temperature or pressure control, the flat plate-shaped fiber aggregate was successfully taken out from the die. As the result of taking out the plate-shaped fiber aggregate from the die, it was confirmed that the fibers had attached to each other firmly and the plate-shaped fiber aggregate had a sufficient hardness that would not let the plate-shaped fiber aggregate bend or sink when held in a hand. Furthermore, the plate-shaped fiber aggregate was put on a flat place in order to confirm warpage. As a result, it was confirmed that the fiber aggregate had almost no warpage, with floating of about 1 mm at the ends of the fiber aggregate.

The obtained plate-shaped fiber aggregate was pasted, using a double-face tape, on a feeding plate of an automatic press cutting-type cutting device (NJ SERIES 1200 TYPE, available from Ogino Seiki Co., Ltd.), and a single-edged blade was set as the cutting blade, to cut the plate-shaped fiber aggregate at a shot number of 500 shots/minute and at a cutting length of 60 micrometers. The cut fibers were observed with a scanning electron microscope (instrument name: S4200, available from Hitachi, Ltd.). As a result, almost no resin particles having a length of 100 micrometers or greater were observed, and cutting length variation was small. However, coarse particles formed by mutual adhesion of resin particles were confirmed.

Hence, the obtained resin particles containing coarse particles were subjected to separation, using an impact jet mill device (device name: LABO JET MILL, available from Nippon Pneumatic Mfg. Co., Ltd.) at a feed of 20 g/minute and at 0.5 MPa. The resin particles after separation was likewise observed with a scanning electron microscope. As a result, no coarse particles formed by mutual adhesion of particles were confirmed, and it was possible to obtain a powder formed of resin particles with small cutting length variation and a very few erroneous cutting such as redundant cutting and diagonal cutting, having a sharp particle size distribution, and having an approximately uniform particle shape.

The "volume average particle diameter (Mv)", the "number average particle diameter (Mn)", and "volume average particle diameter/number average particle diameter (Mv/Mn)" of the obtained resin particles were measured in the manners described below. The results are presented in Table 2 below.

<Volume Average Particle Diameter (Mv)>

With a particle size distribution measuring instrument (instrument name: MICROTRAC MT3300EXII, available from Microtrac Bel Corp.), the volume average particle diameter (Mv) was measured according to a dry (atmosphere) method, using the particle refractive index of the resin particles, without using a solvent. The particle refractive index of the polybutylene terephthalate (PBT) resin was set to 1.57.

<Number Average Particle Diameter (Mn)>

With a wet flow-type particle diameter/profile analyzer (instrument name: FPIA-3000, available from Sysmex Corporation), the number average particle diameter Mn of the resin particles was measured. The instrument was capable of capturing images of particles contained in a suspension flowing in a glass cell with a CCD at a high speed and analyzing individual particle images in real time. Based on the images, it would be possible to directly analyze the particle profile and the particle diameter. The counting number of particles to be measured is not particularly limited and is preferably 3,000 or greater.

<Mv/Mn>

The value Mv was divided by the value Mn, to calculate Mv/Mn.

<Evaluation>

The "fluidity" and "packing ratio" of the obtained resin particles and "strength of object" of the obtained resin particles relative to injection molding were evaluated in the manners described below. The results are presented in Table 2 below.

<<Fluidity>>

The fluidity was measured using a bulk specific gravity meter (compliant with JIS Z-2504, available from Kuramochi Kagaku Kikai Co., Ltd.) having a pore diameter of 2.5 mm, and evaluated according to the evaluation criteria described below.

—Evaluation Criteria—

A: The resin particles flowed without clogging.

B: The resin particles caused clogging, but flowed when an attempt to collapse the clogging with a wire was given once.

C: The resin particles caused clogging, but flowed when an attempt to collapse the clogging with a wire was given 2 times or more but 10 times or less.

D: The resin particles flowed by constant collapsing with a wire 11 times or more.

E: The resin particles did not flow even by constant collapsing with a wire.

<<Packing Ratio>>

The loose density of the produced resin powder for producing a three-dimensional object was measured with a bulk specific gravity meter (compliant with JIS Z-2504, available from Kuramochi Kagaku Kikai Co., Ltd.) having a pore diameter of 2.5 mm, and the measured loose density was divided by the true density of each resin, to obtain a loose packing ratio (%).

When it was the case that the packing ratio (%) was 28% or higher, the resin powder was of a practically usable level not only in terms of confirmation of object shape, but also in terms of confirmation of fitting and confirmation of functions.

<<Strength of Object>>

With a SLS-type object producing apparatus (apparatus name: AM S5500P, available from Ricoh Co., Ltd.), 10 kg of the powder was added into a supply bed of the SLS-type object producing apparatus.

The set conditions include an average layer thickness of 0.1 mm, a laser power output of 10 watts or higher but 150 watts or lower, a laser scanning space of 0.1 mm, and a temperature lower by 3 degrees C. from the melting point as a floor temperature for parts. Using the resin powder for producing a three-dimensional object and the SLS-type object producing apparatus, five tensile test specimens were produced such that the specimens were arranged side by side with the specimens' longer direction aligned along a Y-axis direction and with the specimens' center positioned on the Y-axis direction. The interval between the object layers was 5 mm. For the tensile test specimen samples, a Type 1A multipurpose dog bone-like test specimen having a length of 150 mm and compliant with ISO (International Organization for Stan-dardization) 3167 (the specimen having a center portion having a length of 80 mm, a thickness of 4 mm, and a width of 10 mm) was used. Object production was performed on the 20th layer, which was within an initial period in the object production time. Furthermore, various samples were added onto the upper side, to set the object production time to take 50 hours. The "tensile strength" of the three-dimensional object tensile test pieces obtained here was evaluated with the use of a tensile tester compliant with ISO 527 (instrument name: AGS-5KN, available from Shimadzu Corporation). The testing speed in the tensile test was constant at 50 mm/minute. The initial value of the tensile strength was the average of measured values obtained from 5 times of testing of the first three-dimensional object produced.

When it was the case that the strength (%) of the object was higher than or equal to 70% of the strength of an injection-molded object, the resin powder was of a practically usable level not only in terms of confirmation of object shape, but also in terms of confirmation of fitting and confirmation of functions.

Example 2

Resin particles were produced in the same manner as in Example 1, except that unlike in Example 1, the pressure was changed to 2 MPa.

The result of scanning electron microscopic observation of the obtained resin particles is presented in Table 6. As a result, no coarse particles formed by mutual adhesion of particles were confirmed, and it was possible to obtain a powder formed of resin powders with small cutting length variation and a very few erroneous cutting such as redundant cutting and diagonal cutting, having a sharp particle size distribution, and having an approximately uniform particle shape.

Example 3

The resin particles obtained in Example 2 was further subjected to a conglobation treatment. The conglobation treatment was performed using a conglobation treatment device (device name: MP-TYPE MIXER MP5A/1, available from Mitsui Kozan Co., Ltd.) at a stirring speed of 9,600 rpm for 10 minutes.

The result of scanning electron microscopic observation of the obtained resin particles is presented in Table 7. As a result, it was confirmed that the end portions of the particles were rounded. Furthermore, it was confirmed that the powder formed of these resin particles had an apparently improved fluidity.

Example 4

Resin particles were produced in the same manner as in Example 3, except that with an extruder (available from Japan Steel Works, Ltd.), pellets of a polybutylene terephthalate (PBT) resin (99.7% by mass), to which a phenol-based antioxidant (product name: AO-60, available from ADEKA Corporation) (0.1% by mass) and a phosphate-based antioxidant (product name: PEP-36, available from ADEKA Corporation) (0.2% by mass) were added unlike in Example 3, were subjected to drawing after stirred, so as to be formed into fibers.

The obtained resin particles were observed with a scanning electron microscope. As a result, no coarse particles formed by mutual adhesion of particles were confirmed, and it was possible to obtain a powder formed of resin particles with small cutting length variation and a very few erroneous cutting such as redundant cutting and diagonal cutting, having a sharp particle size distribution, and having an approximately uniform particle shape.

Example 5

Resin particles were produced in the same manner as in Example 3, except that unlike in Example 3, the temperature condition in the heat press step was set to 170 degrees C.

The obtained resin particles were observed with a scanning electron microscope. As a result, almost no coarse particles formed by mutual adhesion of particles were confirmed, but there was a bit greater cutting length variation, and particles having a length of about 80 micrometers were observed more or less. Moreover, there was an increase in the amount of particles cut redundantly, and the particle size distribution was slightly broader than in Example 1. However, it was possible to obtain a powder formed of resin particles having an almost uniform particle shape.

Example 6

Resin particles were produced in the same manner as in Example 3, except that unlike in Example 3, the temperature condition in the heat press step was set to 140 degrees C.

The obtained resin particles were observed with a scanning electron microscope. As a result, almost no coarse particles formed by mutual adhesion of particles were confirmed, but there was a bit greater cutting length variation, and particles having a length of about 90 micrometers were observed more or less. Moreover, there was an increase in the amount of particles cut redundantly, and the particle size distribution was slightly broader than in Example 1. However, it was possible to obtain a powder formed of resin particles having an almost uniform particle shape.

Example 7

Resin particles were produced in the same manner as in Example 3, except that unlike in Example 3, the temperature and pressure conditions in the heat press step were changed to 170 degrees C. and 5 MPa.

The obtained resin particles were observed with a scanning electron microscope. As a result, no coarse particles formed by mutual adhesion of particles were confirmed, and it was possible to obtain a powder formed of resin particles with small cutting length variation and a very few erroneous cutting such as redundant cutting and diagonal cutting, having a sharp particle size distribution, and having an approximately uniform particle shape.

Example 8

Resin particles were produced in the same manner as in Example 3, except that unlike in Example 3, fibers prepared in the manner described below using a polypropylene (PP) resin instead of a polybutylene terephthalate (PBT) resin were used and the temperature condition in the heat press step was changed to 140 degrees C.

With an extruder (available from Japan Steep Works, Ltd.) with nozzle openings having a circular shape, pellets of a polypropylene (PP) resin (product name: NOVATEC MA3, available from Japan Polypropylene Corporation, with a melting point of 180 degrees C. and a glass transition temperature of 0 degrees C.) were subjected to drawing after stirred at a temperature higher than the melting point by 30 degrees C., so as to be formed into fibers. With the number of fibers to be discharged from the nozzles set to 60 fibers and the draw ratio set to about 4 times, drawn fibers having a fiber diameter of about 60 micrometers and containing a thermoplastic resin were obtained. The obtained fibers were measured by DSC with an instrument named: DSC Q200 (available from TA Instruments), to find that the melting point was 165 degrees C.

The obtained resin particles were observed with a scanning electron microscope. As a result, no coarse particles formed by mutual adhesion of particles were confirmed, and it was possible to obtain a powder formed of resin particles with small cutting length variation and a very few erroneous cutting such as redundant cutting and diagonal cutting, having a sharp particle size distribution, and having an approximately uniform particle shape.

Comparative Example 1

Resin particles were produced in the same manner as in Example 1, except that a bundle of thermoplastic resin-containing drawn fibers (drawn fibers of PBT) obtained in the same manner as in Example 1 was, without being prepared in the form of a fiber aggregate, set on a cutting table without being secured on the cutting table, and cut.

The cut fibers were observed with a scanning electron microscope. As a result, there was a great cutting length variation, and there were many particles having a size of 10 micrometers or less due to repetitive cutting and many short fibers having a size greater than 100 micrometers. Moreover, diagonal cutting was frequently observed. It was found that the quality of an object was much poorer than an injection-molded object.

Comparative Example 2

Thermoplastic resin-containing drawn fibers (drawn fibers of PBT) in a bundle obtained in the same manner as in Example 1 were arranged side by side over a polyvinyl chloride (PCV) film (product name: ALTRON, available from DiaPlus Film Inc.), covered from above with a PCV film, and subjected to lamination, to obtain an aggregate of long fibers having an average thickness of 2 mm.

The sheet obtained by coating the bundle of fibers with films by lamination was pasted, using a double-face tape, on a feeding plate of an automatic press cutting-type cutting device and cut in the same manner as in Example 1, to produce resin particles. The cut fibers were observed with a scanning electron microscope. As a result, it was found that not only was there a greater cutting length variation, but also many very long fibers having a size of some millimeters were mixed. Furthermore, according to this method, the thickness of the sandwiched fibers in the sheet needed to be about 2 mm at the maximum, and when the thickness was 3 mm or greater, there was a significantly greater cutting length variation and the obtained product was short fibers rather than resin particles. Moreover, adjustment was made so as not to cut the PCV films all across in order for the films to be easily removable afterwards, but minute dust and chips of the films got included in the resin particles nevertheless, and it was impossible to cleanly remove the included dust and chips. There was also contamination that seemed to be a glue component for the PVC films, and it was found that the fluidity was significantly poor.

Comparative Example 3

Resin particles were produced in the same manner as in Example 1, except that a bundle of thermoplastic resin-containing drawn fibers (drawn fibers of PBT) obtained in the same manner as in Example 1 was immersed in an oil in a manner that the fibers would be bundled, and the obtained bundle of gathered fibers was set on a cutting table without being secured on the cutting table, and cut.

The cut fibers were observed with a scanning electron microscope. As a result, it was found that not only was there a greater cutting length variation, but also many very long fibers having a size of some millimeters were mixed. Moreover, according to this method, it was impossible to perform object production, with difficulty in separating the powder from the oil.

Comparative Example 4

Resin particles were produced in the same manner as in Example 1, except that a bundle of thermoplastic resin-containing drawn fibers (drawn fibers of PBT) obtained in the same manner as in Example 1 was immersed in pure water in a manner that the fibers would be bundled, and the obtained bundle of gathered fibers was set on a cutting table without being secured on the cutting table, and cut.

The cut fibers were observed with a scanning electron microscope. As a result, it was found that not only was there a greater cutting length variation, but also many very long fibers having a size of some millimeters were mixed. The securing force by water was insufficient, and there was very frequent diagonal cutting of the fibers. Further, although it was possible to perform object production, the quality of the object produced was very poor.

Comparative Example 5

Resin particles were produced in the same manner as in Example 1, except that thermoplastic resin-containing drawn fibers (drawn fibers of PBT) in a bundle obtained in the same manner as in Example 1 were gathered with a clamp in a manner that the fibers would be bundled, and the obtained bundle of gathered fibers was set on a cutting table without being secured on the cutting table, and cut.

The cut fibers were observed with a scanning electron microscope. As a result, it was found that not only was there a greater cutting length variation, but also many very long fibers having a size of some millimeters were mixed. The securing force was insufficient only by securing with a clamp, and there was very frequent diagonal cutting of the fibers. Further, although it was possible to perform object production, the quality of the object produced was very poor.

Comparative Example 6

Resin particles were produced in the same manner as in Example 3, except that unlike in Example 3, the temperature condition in the heat press step was set to 250 degrees C.

The obtained resin particles were observed with a scanning electron microscope. As a result, the fibers were fused and integrated with each other in the fiber aggregate, and were unable to become particles through cutting. Hence, it was impossible to obtain a powder formed of resin particles and to perform evaluation.

TABLE 1

| | Producing method | | | | | | | |
|---|---|---|---|---|---|---|---|---|
| | | Fiber aggregate producing step | | | Particle forming step | | | |
| | | | Heating | | | | | |
| | Thermoplastic resin fiber | Fiber aggregate | temperature (degree C.) | Pressure (MPa) | Shot number (shots/min) | Cutting length (micrometer) | Conglobating step | Presence/absence of impurity inclusion |
| Ex. 1 | PBT | Present | 200 | 1 | 500 | 60 | Absent | Absent |
| Ex. 2 | PBT | Present | 200 | 2 | 500 | 60 | Absent | Absent |
| Ex. 3 | PBT | Present | 200 | 2 | 500 | 60 | Present | Absent |
| Ex. 4 | PBT + deterioration inhibitor | Present | 200 | 2 | 500 | 60 | Present | Absent |
| Ex. 5 | PBT | Present | 170 | 2 | 500 | 60 | Present | Absent |
| Ex. 6 | PBT | Present | 140 | 2 | 500 | 60 | Present | Absent |
| Ex. 7 | PBT | Present | 170 | 5 | 500 | 60 | Present | Absent |
| Ex. 8 | PP | Present | 140 | 2 | 500 | 60 | Present | Absent |
| Comp. Ex. 1 | PBT | Merely set on cutting table in form of fibers | Absent | Absent | 500 | 60 | Absent | Absent |
| Comp. Ex. 2 | PBT | Sandwiched by lamination | Absent | Absent | 500 | 60 | Absent | Glue component for lamination |
| Comp. Ex. 3 | PBT | Gathered by oil immersion | Absent | Absent | 500 | 60 | Absent | Oil |
| Comp. Ex. 4 | PBT | Gathered by water immersion | Absent | Absent | 500 | 60 | Absent | Water |
| Comp. Ex. 5 | PBT | Gathered with clamp | Absent | Absent | 500 | 60 | Absent | Absent |
| Comp. Ex. 6 | PBT | Present | 250 | 2 | 500 | 60 | Present | Absent |

TABLE 2

| | Evaluation result | | | | | |
|---|---|---|---|---|---|---|
| | Resin particles | | | Resin particles | | Strength (%) of object (relative to injection- |
| | Mv (micrometer) | Mn (micrometer) | Mv/Mn | Fluidity | Packing ratio (%) | molded object) |
| Ex. 1 | 100 | 80 | 1.25 | C | 33 | 85 |
| Ex. 2 | 70 | 60 | 1.17 | B | 40 | 90 |
| Ex. 3 | 70 | 60 | 1.17 | A | 46 | 95 |
| Ex. 4 | 71 | 61 | 1.16 | A | 46 | 95 |
| Ex. 5 | 80 | 55 | 1.45 | B | 42 | 85 |
| Ex. 6 | 90 | 48 | 1.88 | C | 38 | 83 |
| Ex. 7 | 85 | 57 | 1.49 | B | 43 | 90 |
| Ex. 8 | 70 | 60 | 1.17 | A | 45 | 94 |
| Comp. Ex. 1 | 200 | 10 | 20.00 | E | 25 | 40 |
| Comp. Ex. 2 | Unevaluable due to inclusion of glue component | | | | | |
| Comp. Ex. 3 | Unevaluable due to inclusion of oil | | | | | |
| Comp. Ex. 4 | 130 | 10 | 13.00 | E | 25 | 45 |
| Comp. Ex. 5 | 120 | 10 | 12.00 | D | 30 | 50 |
| Comp. Ex. 6 | Unevaluable due to failure in particle formation due to fusing and integration | | | | | |

REFERENCE SIGNS LIST

1: heat press machine
21: cutting machine
24: fiber aggregate

The invention claimed is:

1. A resin particle producing method, comprising:
directly joining fibers that comprise a thermoplastic resin with each other to obtain a fiber aggregate; and
forming the fiber aggregate into particles to obtain resin particles;
wherein the obtaining of the fiber aggregate comprises applying heat press to the fibers.

2. The resin particle producing method according to claim 1,
wherein a heating temperature in the applying heat press is higher than or equal to a crystallization temperature of the thermoplastic resin but lower than or equal to a melting start temperature of the thermoplastic resin, or is higher than or equal to a glass transition point of the thermoplastic resin but lower than or equal to a melting point of the thermoplastic resin.

3. The resin particle producing method according to claim 1,
wherein the obtaining the fiber aggregate further comprises flattening the fiber aggregate by temperature or pressure control.

4. The resin particle producing method according to claim 1 wherein the fiber aggregate has a plate shape.

5. The resin particle producing method according to claim 1,
wherein the forming the fiber aggregate into particles comprises cutting the fiber aggregate.

6. The resin particle producing method according to claim 1, further comprising
separating the resin particles adhering to each other.

7. The resin particle producing method according to claim 1, further comprising
conglobating the resin particles.

8. The resin particle producing method according to claim 1,
wherein the fibers comprise drawn fibers.

9. The resin particle producing method according to claim 1,
wherein the fibers have a diameter of 5 micrometers or greater but 150 micrometers or less.

10. The resin particle producing method according to claim 1,
wherein the resin particles have a volume average particle diameter of 150 micrometers or less.

11. The resin particle producing method according to claim 1,
wherein volume average particle diameter/number average particle diameter (Mv/Mn) of the resin particles is 2.00 or less.

12. The resin particle producing method according to claim 1,
wherein the thermoplastic resin comprises at least one selected from the group consisting of polyolefin, poly amide, polyester, polyaryl ketone, polyphenylene sulfide, a liquid crystal polymer, polyacetal, polyimide, and a fluororesin.

13. The resin particle producing method according to claim 12,
wherein the fibers further comprise at least one additive selected from the group consisting of an antioxidant, a fluidizer, a reinforcing agent, a flame retardant, a plasticizer, a stabilizer, and a crystal nucleating agent.

14. The resin particle producing method according to claim 12,
wherein the polyolefin comprises at least one selected from the group consisting of polyethylene and polypropylene.

15. The resin particle producing method according to claim 12,
wherein the polyamide comprises at least one selected from the group consisting of aromatic polyamide, polyamide 410, polyamide 4T, polyamide 6, polyamide 66, polyamide MXD6, polyamide 610, polyamide 6T, polyamide 11, polyamide 12, polyamide 9T, and polyamide 10T.

16. The resin particle producing method according to claim 13,
wherein the polyester comprises at least one selected from the group consisting of polyethylene terephthalate, polybutylene terephthalate, and polylactic acid.

17. The resin particle producing method according to claim 16,
wherein the polyester comprises polybutylene terephthalate.

18. The resin particle producing method according to claim 12,
wherein the polyaryl ketone comprises at least one selected from the group consisting of polyether ether ketone, polyether ketone, and polyether ketone ketone.

19. A resin particle producing method, comprising:
obtaining a plate-shaped fiber aggregate from fibers that comprise a thermoplastic resin; and
forming the fiber aggregate into particles to obtain resin particles;
wherein the obtaining of the fiber aggregate comprises applying heat press to the fibers.

* * * * *